(12) United States Patent
Tamura

(10) Patent No.: US 10,574,645 B2
(45) Date of Patent: Feb. 25, 2020

(54) AUTHORITY VERIFICATION SYSTEM, AUTHORITY VERIFICATION METHOD, AND COMPUTER-READABLE STORAGE MEDIUM

(71) Applicant: CANON KABUSHIKI KAISHA, Tokyo (JP)

(72) Inventor: Yu Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 15/814,538

(22) Filed: Nov. 16, 2017

(65) Prior Publication Data

US 2018/0152441 A1   May 31, 2018

(30) Foreign Application Priority Data

Nov. 25, 2016   (JP) .................................. 2016-229190

(51) Int. Cl.
*H04L 29/06* (2006.01)

(52) U.S. Cl.
CPC ...... *H04L 63/0815* (2013.01); *H04L 63/0884* (2013.01); *H04L 63/0892* (2013.01); *H04L 63/101* (2013.01)

(58) Field of Classification Search
CPC ............... H04L 63/0815; H04L 63/101; H04L 63/0892
USPC ....................................................... 713/150
See application file for complete search history.

(56) References Cited

U.S. PATENT DOCUMENTS

| | | | |
|---|---|---|---|
| 8,997,196 B2 * | 3/2015 | Kariv | ...................... H04L 63/08 713/156 |
| 9,071,593 B2 * | 6/2015 | Vrancken | ................. G06F 21/31 |
| 9,219,611 B1 * | 12/2015 | Naik | ...................... H04L 9/3247 |
| 9,300,660 B1 * | 3/2016 | Borowiec | .............. H04L 63/083 |
| 9,323,916 B1 * | 4/2016 | Wu | ........................... G06F 21/44 |
| 9,386,007 B2 * | 7/2016 | Minov | ................ H04L 63/0815 |
| 9,608,990 B2 * | 3/2017 | Kobayashi | .............. H04L 47/70 |
| 9,742,757 B2 * | 8/2017 | Canning | ............. H04L 63/0807 |
| 9,917,821 B2 * | 3/2018 | Gillmore | ............... H04L 63/062 |
| 2015/0193600 A1 * | 7/2015 | Matsuda | ............. H04L 63/0823 726/9 |
| 2015/0281218 A1 * | 10/2015 | Bowser | ............... H04L 63/0823 726/7 |
| 2015/0341456 A1 * | 11/2015 | Chiu | ........................ H04L 67/26 709/219 |
| 2017/0012778 A1 * | 1/2017 | Choyi | .................. H04L 63/0884 |
| 2017/0012965 A1 * | 1/2017 | Hurst | ................... H04L 63/0892 |
| 2017/0026376 A1 * | 1/2017 | Matsugashita | ....... H04L 63/0876 |
| 2017/0118218 A1 * | 4/2017 | Koottayi | ............... H04L 63/101 |
| 2017/0118223 A1 * | 4/2017 | Mathew | ................ H04L 63/105 |

(Continued)

FOREIGN PATENT DOCUMENTS

JP   2011-238258 A   11/2011

*Primary Examiner* — Lynn D Feild
*Assistant Examiner* — Viral S Lakhia
(74) *Attorney, Agent, or Firm* — Cowan, Liebowitz & Latman, P.C.

(57) ABSTRACT

A per-resource user authority management unit that manages user authorities per resource, a user authority refinement unit that refines authorities linked to a user by the per-resource user authorities, and an authority verification unit that determines whether execution of processing with respect to a resource is permitted by using an authority that has been refined by the user authority refinement unit are provided.

7 Claims, 13 Drawing Sheets

(56) References Cited

U.S. PATENT DOCUMENTS

2017/0180335 A1* 6/2017 Quinlan .................. H04L 63/08
2018/0295126 A1* 10/2018 Gilpin ................... G06F 21/335

* cited by examiner

F I G. 4A
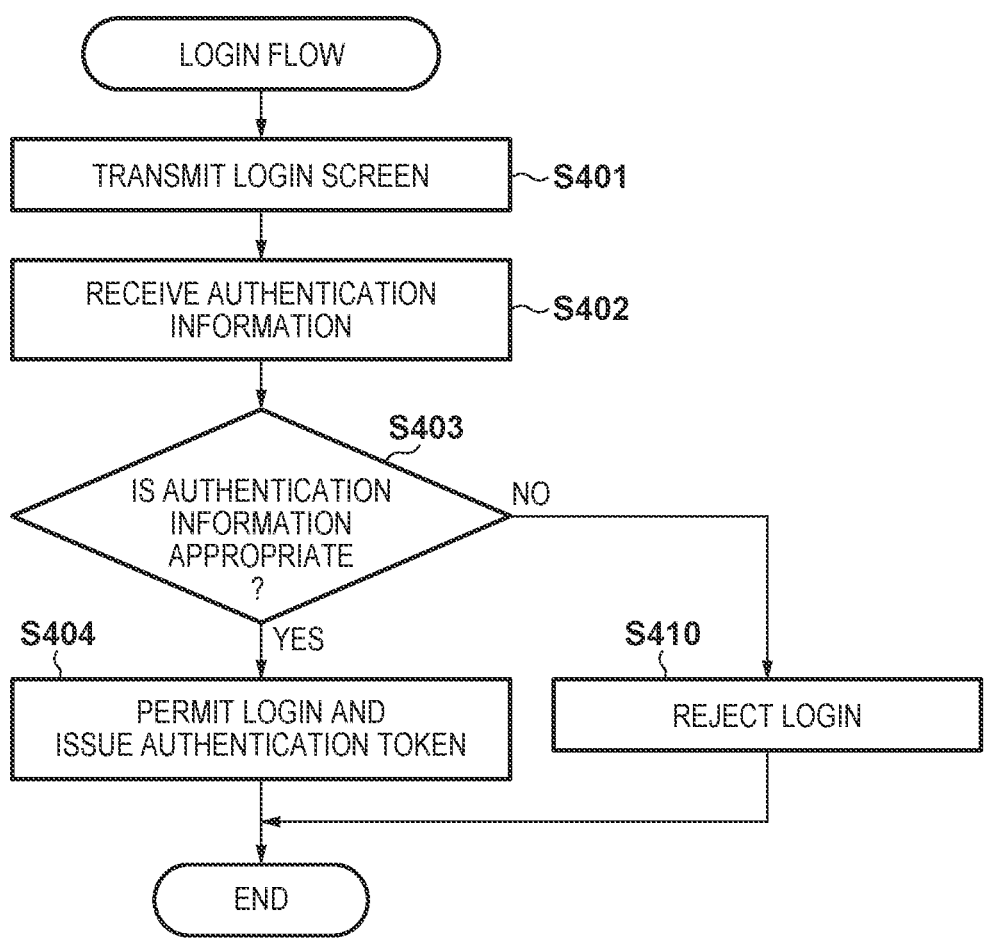

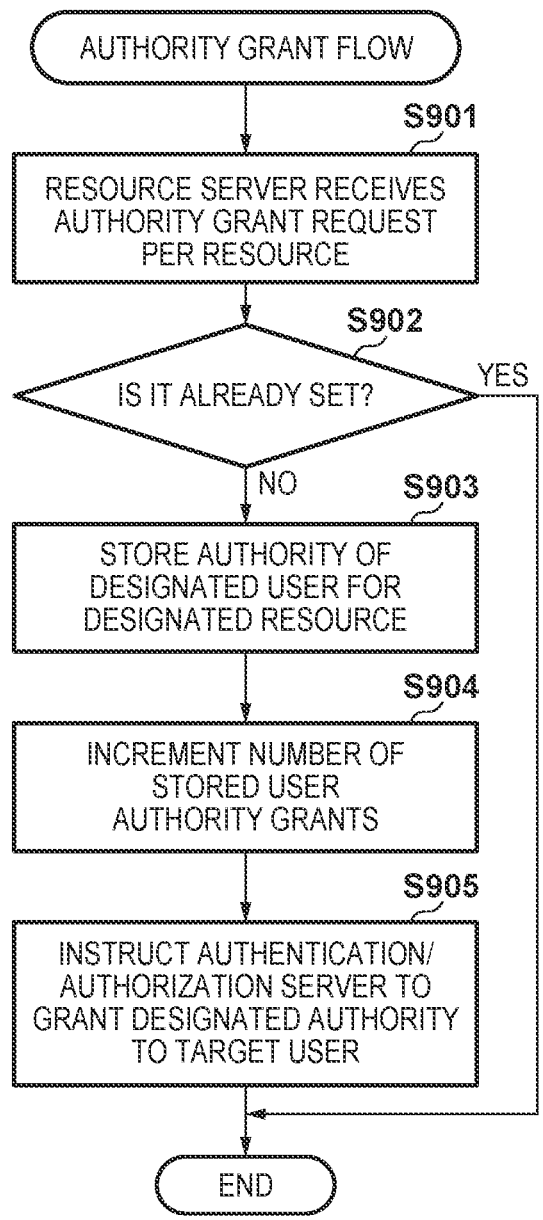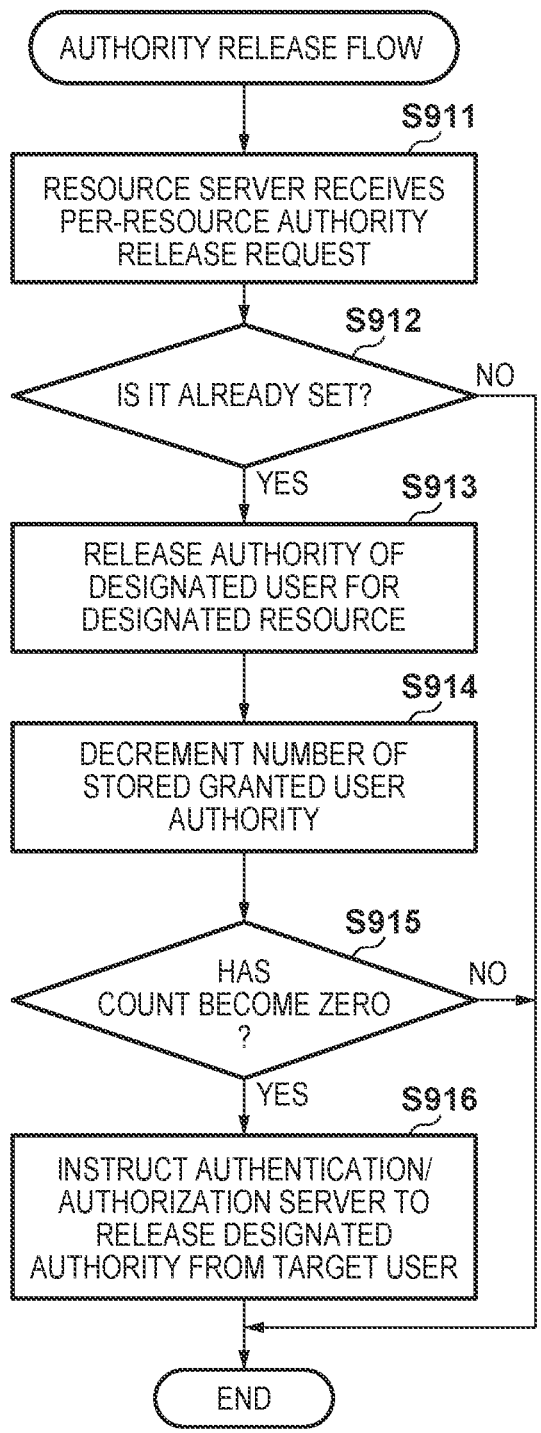

AUTHORITY VERIFICATION SYSTEM, AUTHORITY VERIFICATION METHOD, AND COMPUTER-READABLE STORAGE MEDIUM

BACKGROUND OF THE INVENTION

Field of the Invention

The present invention relates to an authority verification system, an authority verification method, and a computer-readable storage medium for enabling per-resource authority verification, for example in a case where an agent that performs authority verification and an agent that performs resource management are different.

Description of the Related Art

To control access to a resource, conventionally, for a file under the management of an OS, for example, the OS is able to control whether to permit or reject access for each user or user group. This is because the OS implements both file management and authority verification. As an existing method for switching behavior of access control with respect to a resource under the management of an OS, a method for switching an authority in accordance with a password at a time of login has been proposed (for example, Japanese Patent Laid-Open No. 2011-238258).

Here, consideration is given for authority verification with respect to a resource in a cloud service. In particular, consideration is given for a cloud service that includes a plurality of application services that provide functions to users. In such a case, instead of authority verification of a user being realized for each application service that provides a function, it is typical for user authority verification to be realized as a service that aggregates it into one place as with an authentication/authorization service. This is because it is good practice to aggregate functions relating to security to one place, and improve security predominantly in the aggregated place. In such a case, because the authentication/authorization service collaborates with a plurality of application services, it is considered appropriate to manage each resource of an application service on a resource server that corresponds to the application service. When consideration is given to a cloud service that provides a user with a plurality of functions, an agent for performing authority verification and an agent for performing resource management are respectively distributed to the authentication/authorization service and the application service. In such a case, there is no mechanism for a user to change the scope of an authority for each resource of an application service. Therefore, for example, granting an authority for each resource for each user, and authenticating or authorizing the authority for each user is difficult. In addition, in the authentication/authorization service, even if an authority per resource is managed for each user, if there is a change of the resource, the change must be reflected in the authority, and problems may occur in the consistency or convenience of authority management.

SUMMARY OF THE INVENTION

The present invention provides an authority verification system and a computer-readable storage medium that can control authorities that are different for each user and each resource, while maintaining convenience and consistency.

The present invention has the following configuration.

According to one aspect of the present invention, there is provided an authority verification system that verifies an access authority for a resource, the system comprising: a per-resource user authority management unit configured to manage per-resource user authorities established for each resource; a user authority management unit configured to manage user authorities; a specification unit configured to, in accordance with an access request for a designated resource, specify, based on the per-resource user authorities managed by the per-resource user authority management unit, an authority necessary for the access request with respect to the designated resource, and to specify, based on the user authorities managed by the user authority management unit, a user authority held by a transmission source of the access request; a refinement unit configured to decide an access authority by refining the specified user authority, by the authority necessary for the access request with respect to the designated resource that is specified by the specification unit; a validation unit configured to determine whether access to the resource corresponding to the access request is permitted by the access authority; and a unit configured to permit the transmission source to access the resource in a case where it is determined that the access is permitted by the validation unit.

By virtue of the present invention, it is possible to perform authority control that is different for each user and each resource, while maintaining convenience and consistency. In such a case, there ceases to be a need to manage, in an authentication server, a user authority per resource.

Further features of the present invention will become apparent from the following description of exemplary embodiments with reference to the attached drawings.

BRIEF DESCRIPTION OF THE DRAWINGS

FIG. 4A and FIG. 4B are token issuing flows according to the present embodiment.

FIG. 9A and FIG. 9B are flows for granting and releasing an authority according to the second embodiment.

DESCRIPTION OF THE EMBODIMENTS

Hereinafter, embodiments for working the present invention are explained using drawings. Note that, in the present embodiment, a system such as the following is considered. For example, a multifunction peripheral management service for managing operating information of multifunction peripherals for each zone is considered. Here, a user X is responsible for managing multifunction peripherals in a zone A, and the user X registers information of the multifunction peripherals of the zone A to a multifunction peripheral management service which is an application service. Consider a case where it is necessary for the user X to not be able register information of multifunction peripherals in a zone B into the multifunction peripheral management service, but to be able to refer to this information. Here, if the authentication/authorization service can perform authority management such as "the user X has a zone A information registration authority and a zone B information reference authority", the previously described case can be implemented. A zone C being newly added during operation of the multifunction peripheral management service can also be considered. With the previously described method, addition of an authority definition to the authentication/authorization service is needed each time a zone is added. Accordingly, load on the authentication/authorization service increases as authority definitions increase. Because there is a high possibility that the authentication/authorization service will execute authentication/authorization processing for other services and not only the multifunction peripheral management service, it is not practical to incur too much load on one service.

In contrast, as another method of authority management, performing authority management without considering zones, such as having "a user X has a registration authority and a reference authority" in the authentication/authorization service, so that authority definition is not performed each time a zone is added can be considered. In such a case, while it is possible to implement the user X having a zone A information registration authority and a zone B information reference authority, because the authority and the zone are not linked, the user X will also have a zone B information registration authority and a zone A information reference authority. This means that authorities are excessively allocated, and that it is not possible to switch authorities by resource.

By working the present application invention which is explained below, it is possible to solve these problems.

First Embodiment

Figure 1:
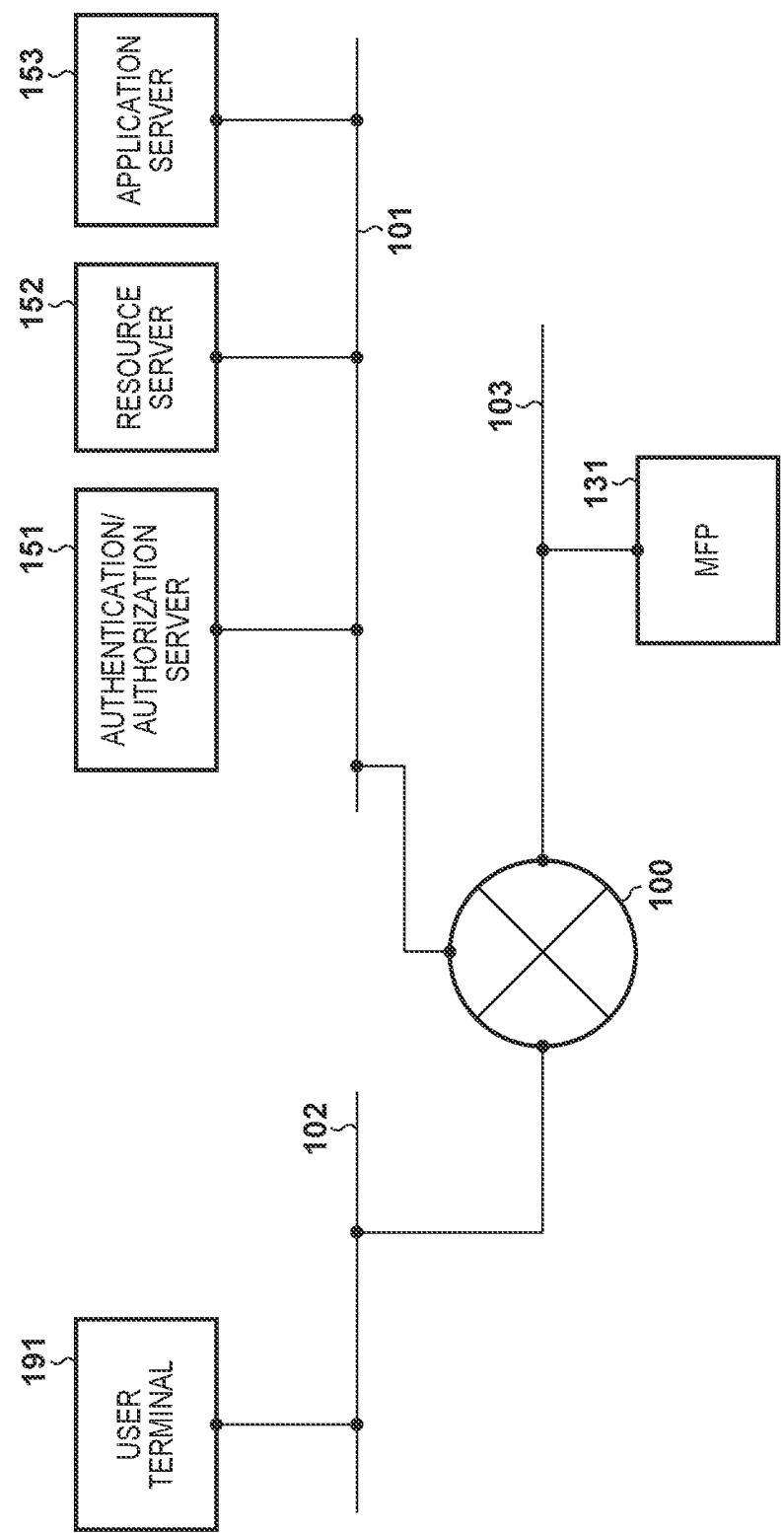
FIG. 1 is a view that illustrates a network configuration.

An authority transfer system (or an authentication system or an authority verification system) according to the present embodiment is realized on a network having a configuration as illustrated in FIG. 1. A WAN 100 is a wide area network, and in the present embodiment a World Wide Web system is constructed. A LAN 101 and a LAN 102 are local area networks for connecting each configuration element.

An authentication/authorization server 151 (may also be referred to as an authentication server 151) performs user authentication and authorization, and issues and verifies authentication tokens and access tokens. A resource server 152 manages resources. An application server 153 provides a service in response to a request from a user terminal 191, for example. Here, an authentication token is a set of information for certifying that a user is a legitimate user of a system. An access token is a set of information for certifying that an application that operates on the application server 153 for example has been permitted to perform some operation (or a specific operation) by a user, and is issued by the user performing an authorization operation with respect to the application. An access token may also be said to be information that indicates an authority that has been delegated from a user, and for example includes information indicating the user that is the delegation source of the authority or the delegated authority. For example, when an application uses an access token for accessing a resource managed by a cloud service, the application can access the resource by the scope permitted to the user who performed the authorization operation. The user terminal 191 is operated by the user. Each server and the user terminal 191 are computers, for example.

The authentication/authorization server 151 and the resource server 152 are connected to each other via the LAN 101. The user terminal 191 is similarly connected to the servers via the WAN 100, the LAN 102, and the LAN 101. Note that the authentication/authorization server 151 and the resource server 152 may be configured on respectively different LANs, may be configured on the same LAN, or may be configured on the same PC or server computer. In addition, while the authentication/authorization server 151 and the resource server 152 are each drawn as one device in FIG. 1, they may each be a server system configured from a plurality of servers, and for example the authentication/authorization server 151 may be configured by clustering a plurality of servers. Note that a case of referring to a server system in the present application invention is assumed to indicate an apparatus for providing a specific service that is configured from at least one server.

Furthermore, a LAN 103 is connected to the wide area network 100 which is the Internet or the like, and an MFP (a multifunction peripheral or an image forming apparatus) 131 is connected to the LAN 103. The MFP 131 can hold, for example, setting information and image data obtained in accordance with a scan or the like. In addition to this held information, the MFP 131 can provide functions such as a scanner function, a printer function, and an image processing function as shared resources to the application server 153 or the like to which an access authority has been granted.

<Hardware for Server and Terminal>

Figure 2:
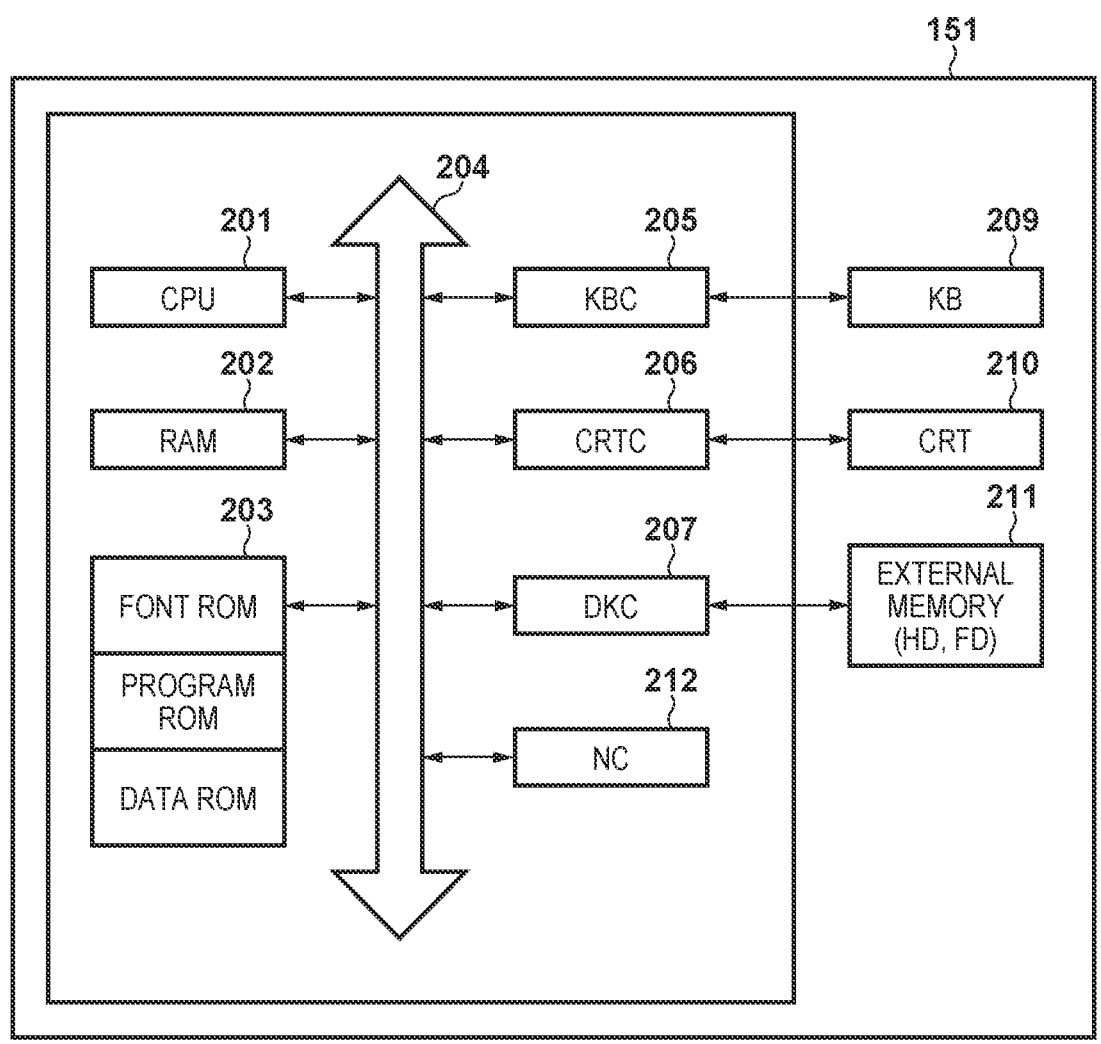
FIG. 2 is a configuration view of a server computer according to an embodiment of the present invention.

FIG. 2 is a figure for illustrating a configuration of the authentication/authorization server 151 according to the present embodiment. The configuration of the resource server 152 is similar to the configuration of the user terminal 191. Note that it is assumed that the hardware block diagram illustrated in FIG. 2 corresponds to the hardware block diagram of a typical information processing apparatus, and it is possible to apply the hardware configuration of a typical information processing apparatus to the server computers and the user terminal of the present embodiment.

In FIG. 2, a CPU 201 executes a program such as an OS or an application that is stored in a program ROM of the ROM 203 or has been loaded into a RAM 202 from a hard disk 211. Here, an OS is an abbreviation for an operating system that operates on a computer, and the operating system will be referred to as the OS hereinafter. Processing of each flowchart that is explained later can be realized by execution of this program. The RAM 202 serves as a main memory, a work area, or the like, for the CPU 201. A keyboard controller (KBC) 205 controls key inputs from the keyboard (KB) 209 or a pointing device (not shown). A display controller (CRTC) 206 controls displaying to a display 210. A disk controller (DKC) 207 controls data access in, for example, a floppy (registered trademark) disk (FD) or the hard disk (HD) 211 that stores various data. An NC 212 is connected to a network and executes communication control processing with another device connected to the network. Note that, in the entirety of the explanation described below, unless otherwise specified, an agent of execution on hardware is the CPU 201, and an agent of execution on software is a program installed in the hard disk (HD) 211, for example an application program.

<Configuration of Software Modules of Authentication/Authorization Server and Resource Server>

Figure 3A:
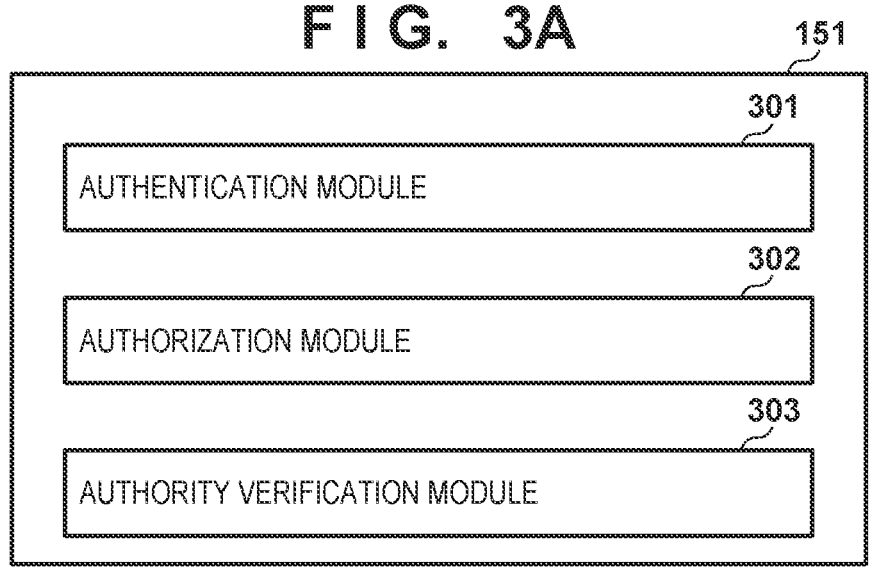
FIG. 3A, FIG. 3B, and FIG. 3C are module configuration diagrams according to the present embodiment.
Figure 3B:
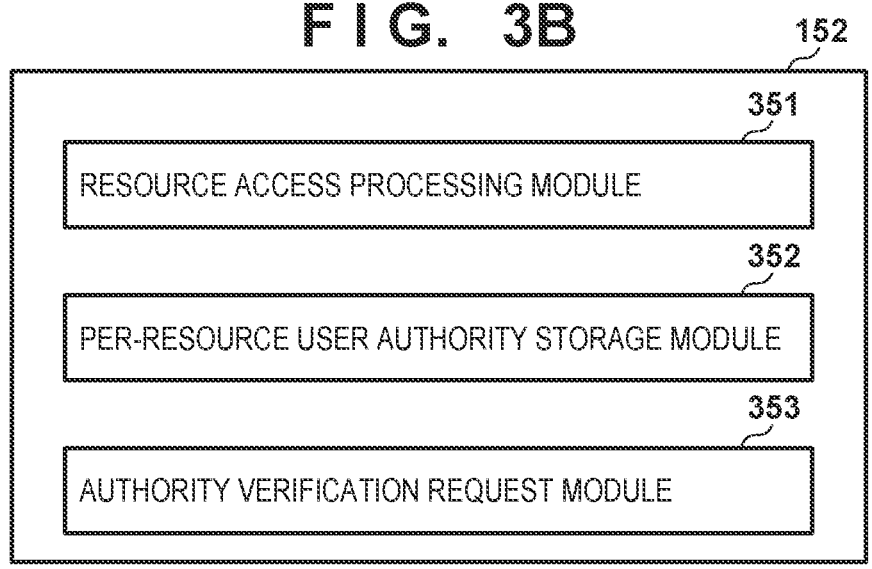
Figure 3C:
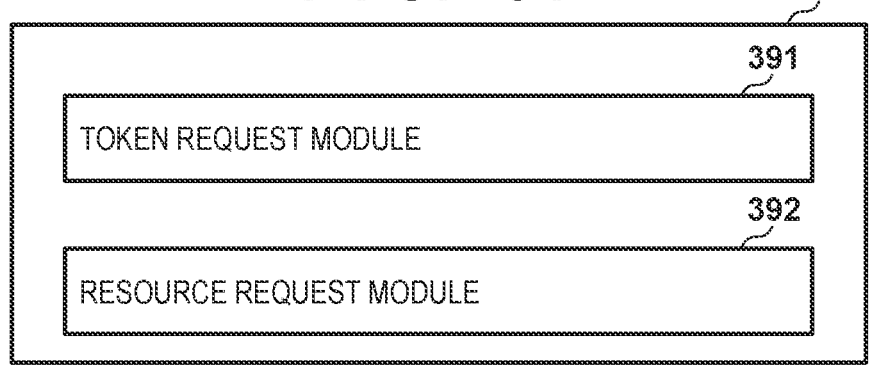

FIG. 3A to FIG. 3C are views that illustrate the configuration of modules of the authentication/authorization server 151 and the resource server 152, according to the present embodiment. FIG. 3A illustrates a module configuration of the authentication/authorization server 151, and FIG. 3B illustrates a module configuration of the resource server 152. FIG. 3C illustrates a module configuration of the user terminal 191. The authentication/authorization server 151 has an authentication module 301, an authorization module 302, and an authority verification module 303. The resource server 152 has a resource access processing module 351, a per-resource user authority storage module 352, and an authority verification request module 353. The user terminal 191 has a token request module 391 and a resource request module 392.

The authentication module 301 performs user authentication and issues an authentication token in response to a token request from the token request module 391 of the user terminal 191. The authorization module 302 performs authority delegation, display of an authorization confirmation screen, or issuance of an access token, similarly in response to a token request from the token request module 391 of the user terminal 191. The authority verification module 303 performs authority verification by using an authentication token issued by the authentication module 301 or an access token issued by the authorization module 302.

The resource access processing module 351 receives a resource request from the resource request module 392 of the user terminal 191. Upon receiving a resource request, the resource request is processed by using the per-resource user authority storage module 352 or the authority verification request module 353 to confirm the authority of the user.

As a concrete example of a resource, for example zones for grouping multifunction peripherals that are registered in a multifunction peripheral management service can be considered. For example, in the case of a Tokyo zone resource, assume that multifunction peripherals geographically installed in Tokyo are linked thereto. In the case of a resource request for obtaining multifunction peripheral information that is made with respect to the Tokyo zone resource, assume that information of multifunction peripherals that are geographically installed in Tokyo is obtained. In a case of simply referring to a resource below, it is assumed to indicate a zone in which multifunction peripherals are installed and the multifunction peripherals which are linked to that zone, as described above. However, a resource of the present application is not limited to a zone or a multifunction peripheral.

<Login Processing>

FIG. 4A is a login flow in the authentication/authorization server according to the present embodiment. The present flow is started by the authentication/authorization server 151 receiving a login request from the user terminal 191.

Figure 7A:
FIG. 7A and FIG. 7B are views that illustrate examples of screens according to the present embodiment.

In step S401, the authentication module 301 transmits a login screen 1001 as illustrated in FIG. 7A to the user terminal 191. In step S402, the authentication module 301 receives authentication information that is inputted on the login screen 1001. In step S403, the authentication module 301 determines whether the authentication information received in step S402 is appropriate—in other words whether authentication succeeded. If it is determined that the authentication information is appropriate, the processing transitions to step S404. If it is determined that the authentication information is not appropriate, the processing transitions to step S410. Being appropriate means that, for example, authentication information registered in advance matches the authentication information inputted by the user terminal 191.

In step S404, the authentication module 301 permits the user login, issues an authentication token, and this flow ends. Note that the authentication token issued here is linked with the user, and is managed by an issued token table as illustrated in Table 1. For example, in Table 1, a token where a token identifier is An0011223344 indicates that the token type is authentication token, and that a user ID is User X. In addition, it is indicated in Table 1 that a scope setting has not been made for any authentication token. Similarly, a token where a token identifier is Az99887766 indicates that the token type is access token, and that a user ID is User X. It is also indicated that scope.MFP-ReadWrite and scope.MFP-Read are delegated as the scope.

TABLE 1

| Token identifier | Token type | User ID | Scope |
|---|---|---|---|
| An0011223344 | Authentication token | User X | (none) |
| An5566778899 | Authentication token | User Y | (none) |
| An7788990011 | Authentication token | User Z | (none) |
| Az99887766 | Access token | User X | scope.MFP-ReadWrite, scope.MFP-Read |
| ... | ... | ... | ... |

In step S410, the authentication module 301 rejects login for a user that failed authentication, and this flow ends. Note that, for the login flow according to the present embodiment, it is assumed that a typical login flow can be applied.

A user (or a user terminal, or an application executed by a user terminal, or the like) who obtained an authentication token by the above procedure can use the authentication token to make a request to the application server 153, for example, for service provision, and receive the service.

<Processing for Issuing an Access Token>

Figure 4B:
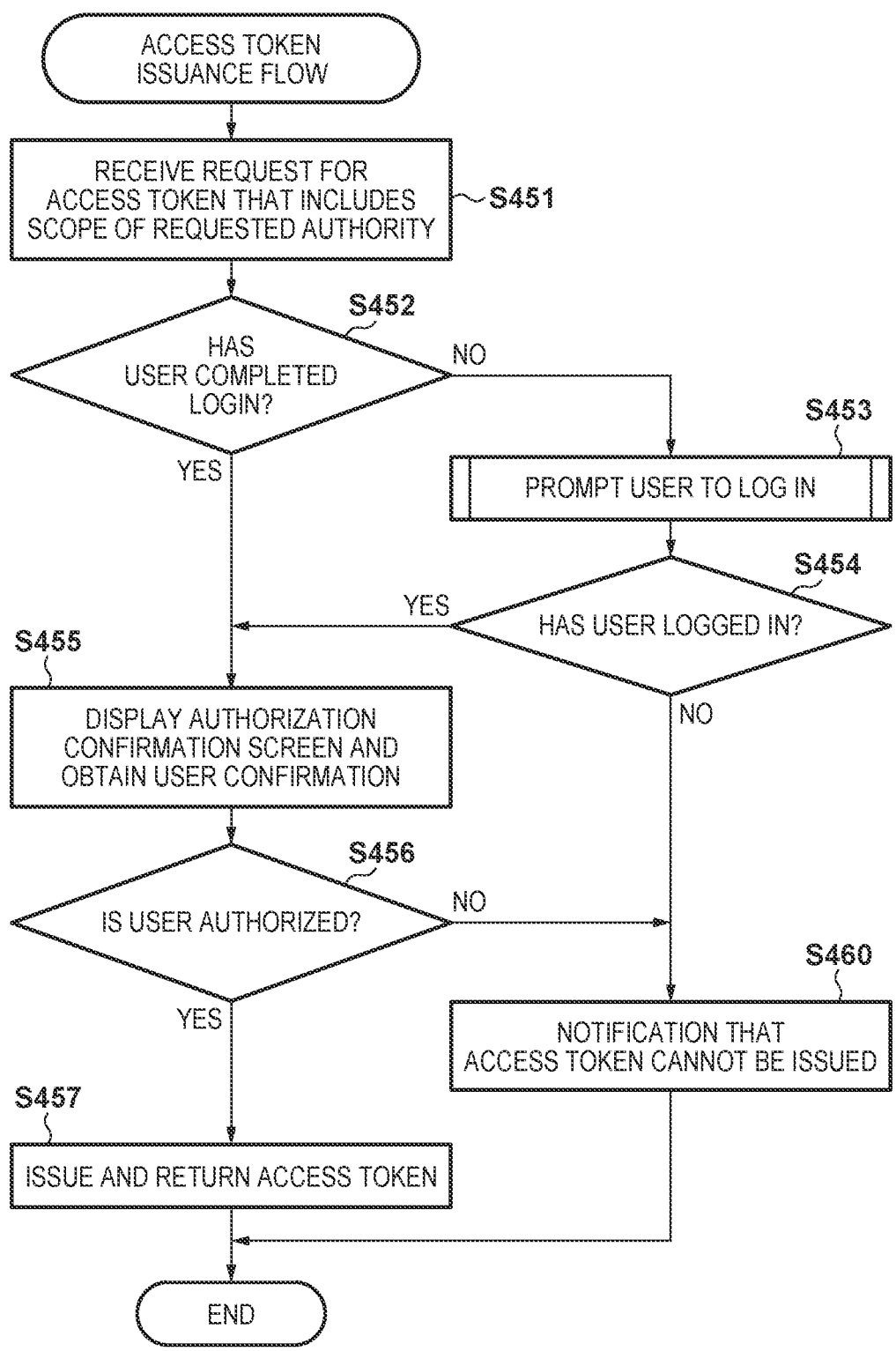

FIG. 4B is a flow for issuing an access token in the authentication/authorization server 151 according to the present embodiment. This flow is started by the authorization module 302 of the authentication/authorization server 151 receiving a request for an access token from a request source such as the user terminal 191 or the application server 153.

In step S451, the authorization module 302 receives an access token issuance request from the user terminal 191. The access token issuance request received here includes user information.

In step S452, the authorization module 302 determines whether the user who is operating the user terminal 191 has logged in. If it is determined that the user has logged in, the processing transitions to step S455. If it is determined that they are not logged in, the processing transitions to step S453. The determination of whether or not the user is already logged in is performed by whether or not an authentication token is included in the issuance request of the access token of step S451 for example.

In step S453, the authentication module 301 transmits a login screen 1001 as illustrated in FIG. 7A to the user terminal 191. Note that details of the login flow are similar to that illustrated in FIG. 4A.

In step S454, the authentication module 301 determines whether the user who corresponds to step S453 has logged in. If it is determined here that the user has logged in, the processing transitions to step S455. If it is determined that the user has not logged in, the processing transitions to step S460.

Figure 7B:

In step S455, the authorization module 302 transmits an authorization confirmation screen 1002 as illustrated in FIG. 7B to the user terminal 191, and prompts the user to confirm. The authorization confirmation screen 1002 displays a scope for which access is to be permitted, and a user presses a "permit" button when permitting access to the data displayed by the application service, and presses a "reject" button when rejecting access, for example. The authorization module 302 receives input in accordance with each button. A scope in which access is permitted may include a type of operation with respect to target information, in addition to a scope of target information. In the example of FIG. 7B, "MFP information" is displayed as target information, and "reading and editing" is displayed as types of target operations. The scope in which access is permitted, such as target information or a type of an operation, is based on information received along with the access token issuance request, for example.

In step S456, the authorization module 302 determines whether authorization of the user corresponding to step S455 has been obtained. If it is determined that authorization is not obtained, the processing transitions to step S457. If it is determined that authorization could not be obtained, the processing transitions to step S460. An operation for selecting permit in FIG. 7B for a user to perform authorization is referred to as an authorization operation, and issuance of an access token is performed by an authorization operation being performed by the user. Details that are authorized here are referred to as a scope, and details authorized for the issued access token are managed as a scope below.

The authorization module 302 in step S457 issues the access token and stores it in a first issued token table in association with the user information included in the issuance request of the access token received in step S451. The issued access token is returned to the user terminal 191 and the flow ends. Note that the access token issued here is managed in an issued token table as illustrated in Table 1 which is described previously. Note that the access token may be issued by an authority delegation protocol such as OAuth 2.0, and in such a case a step in which an authorization code is issued would be added. For an issued access token, a unique token identifier is granted, and by this the token can be specified. Also, for the access token, a type of operation, for example, for which access is permitted is associated as a scope. The scope is set based on the issuance request of the access token and the received access scope for example. In the issued token table, token identifiers, types of token issued, user IDs of logged in users and permitted access scopes are registered in association.

The authorization module 302 in step S460 notifies to the user terminal 191 that the access token cannot be issued, and this flow ends. Note that, for the access token issuance flow according to the present embodiment, it is assumed that a typical access token issuance flow can be applied.

By the above processing, the application that obtained the access token, by using that access token, can access a resource in the scope of authority delegated by the user. Accordingly, the issued token table indicated in Table 1 in which access tokens are registered and the per-resource user authority storage module 352 that manages this can also be called a per-resource user authority management unit which manages a per-resource user authority established for each resource.

<Resource Access Processing>

Figure 5:
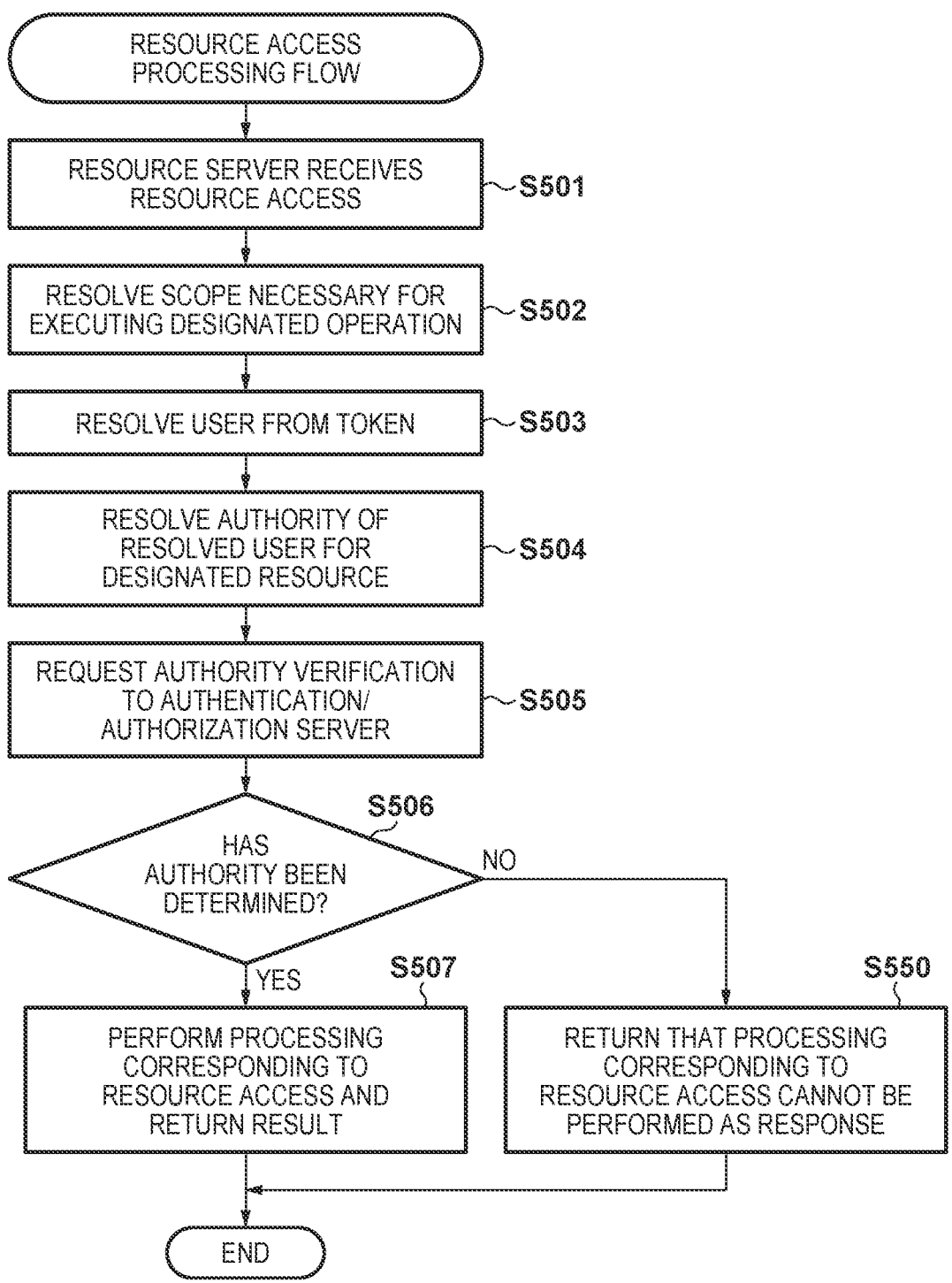
FIG. 5 is a resource access processing flow according to the present embodiment.

FIG. 5 is a processing flow for resource access in the resource server 152 according to the present embodiment. The present flow is started by the resource server 152 receiving a resource access request from the user terminal 191 or the application server 153 to which an authority has been delegated from a user.

The resource access processing module 351 of the resource server 152 in step S501 receives a resource access request from the user terminal 191. Here, an authentication token or an access token, an instruction for a resource that is the target of access, and details of the operation of the resource access are included in the resource access request. The transmission source of the resource access request may be the application server 153 delegated with authority from the user for example, and in such a case an access token, an instruction of the access target resource, and details of the operation of the resource access are included in the resource access request.

The resource access processing module 351 in step S502 resolves the scope necessary for executing the operation designated in step S501. Note that this scope is the same as the scope linked with the access token, and a confirmation that the scope necessary for the operation is linked with the access token is performed at a time of authority verification. Also, it is confirmed whether the user holds an authority that satisfies this scope. A correspondence relationship between the operation and the scope is managed by the per-operation request scope table as is illustrated in Table 2 for example. In the example of Table 2, it is defined that a scope of scope.MFP-ReadWrite is necessary for a ManageDevices operation for managing devices. Scopes corresponding to operations are determined in advance, for example, and may be saved to the per-operation request scope table of Table 2. Accordingly, the resource server 152 searches in the per-operation request scope table for the scope corresponding to the designation of the details of the operation received together with the resource access request, and temporarily saves the corresponding scope. An authority necessary for the details of the operation for which the scope is requested is indicated.

TABLE 2

| Operation | Requested scope |
| --- | --- |
| ManageDevices | scope.MFP-ReadWrite |
| ListDevices | scope.MFP-Read |
| . . . | . . . |

The resource access processing module 351 in step S503 resolves the user linked with the token by using the authentication token or the access token received in step S501 to make a query to the authentication/authorization server 151. The authentication/authorization server 151 that received the query searches for, from the first issued token table for example, a user ID linked to the token identifier and the token type of the received token. If there is a corresponding user ID, it is returned to the resource server 152.

The resource access processing module 351 in step S504 obtains authority information of what authority by which the user resolved in step S503 may operate with respect to the resource designated in step S501. The per-resource user authority storage module 352 stores a per-resource user authority in a per-resource user authority table as illustrated in Table 3. In Table 3, it is indicated that a user User X may operate with the authority of MFP-ReadWrite with respect to an Area-A resource. Specifically, it is assumed the user User X can obtain information and change settings of a multifunction peripheral, with respect to multifunction peripherals geographically installed in Area-A. Also, in a case where a plurality of authorities for a user specific resource are stored, it is assumed that the user holds all of the plurality of authorities for the resource. Ultimately, in step S504, authority information of the specified user with respect to the designated resource is obtained. In this way, identification information that indicates a resource, for example, a user ID, and an authority thereof are associated and registered in the per-resource user authority table. Configuration may be taken such that the per-resource user authority table is stored in the resource server 151 for example, and maintenance thereof is performed from the user terminal 191, for example, by an administrator holding authority therefor.

TABLE 3

| Resource | User ID | Authority |
|---|---|---|
| Area-A | User X | MFP-ReadWrite |
| Area-B | User X | MFP-Read |
| Area-B | User Y | MFP-ReadWrite |
| Area-C | User Y | MFP-ReadWrite |
| . . . | . . . | . . . |

In step S505, the authority verification request module 353 of the resource server 152 makes a request to the authentication/authorization server 151 for an authority verification. Here, the token obtained in step S501, the scope resolved in step S502, and the authority information obtained in step S504 are included in the authority verification request. The authentication/authorization server 151 performs an authority verification in accordance with the received authority verification request. This procedure is described in FIG. 6. To explain briefly, the authentication/authorization server 151 searches for issued token information in Table 1 for example with the received token. Then, it is determined whether or not the scopes associated with that token include all scopes necessary for the operation, which are received together with the authority verification request, and all authorities that the specified user has for the designated resource are included. That there is an authority is determined if all of the scopes and authorities are included. Also, that there is no authority is determined if there is an operation or resource that requires an authority that is not be covered by a scope associated with the token. A result of the determination is transmitted to the resource server 152.

The resource access processing module 351 in step S506 confirms whether it is determined that there is an authority, as a result of the authority verification of step S505. Step S507 is transitioned to when it is determined that there is authority, and step S550 is transitioned to when it is determined that there is no authority.

The resource access processing module 351 in step S507 processes the resource access request received in step S501, returns the result to the user terminal 191, and then this flow ends. In the processing of the resource access request, according to this request, for example, reading data, updating data, allocating memory or calculation resources, or the like are performed.

The resource access processing module 351 in step S550 returns that the resource access request received in step S501 cannot be processed as a response to the user terminal 191, and then this flow ends.

By the above procedure, the resource server 152 determines whether the designated operation is possible with the scope associated with the received token, and executes it if possible.

<Authority Verification Processing>

Figure 6:
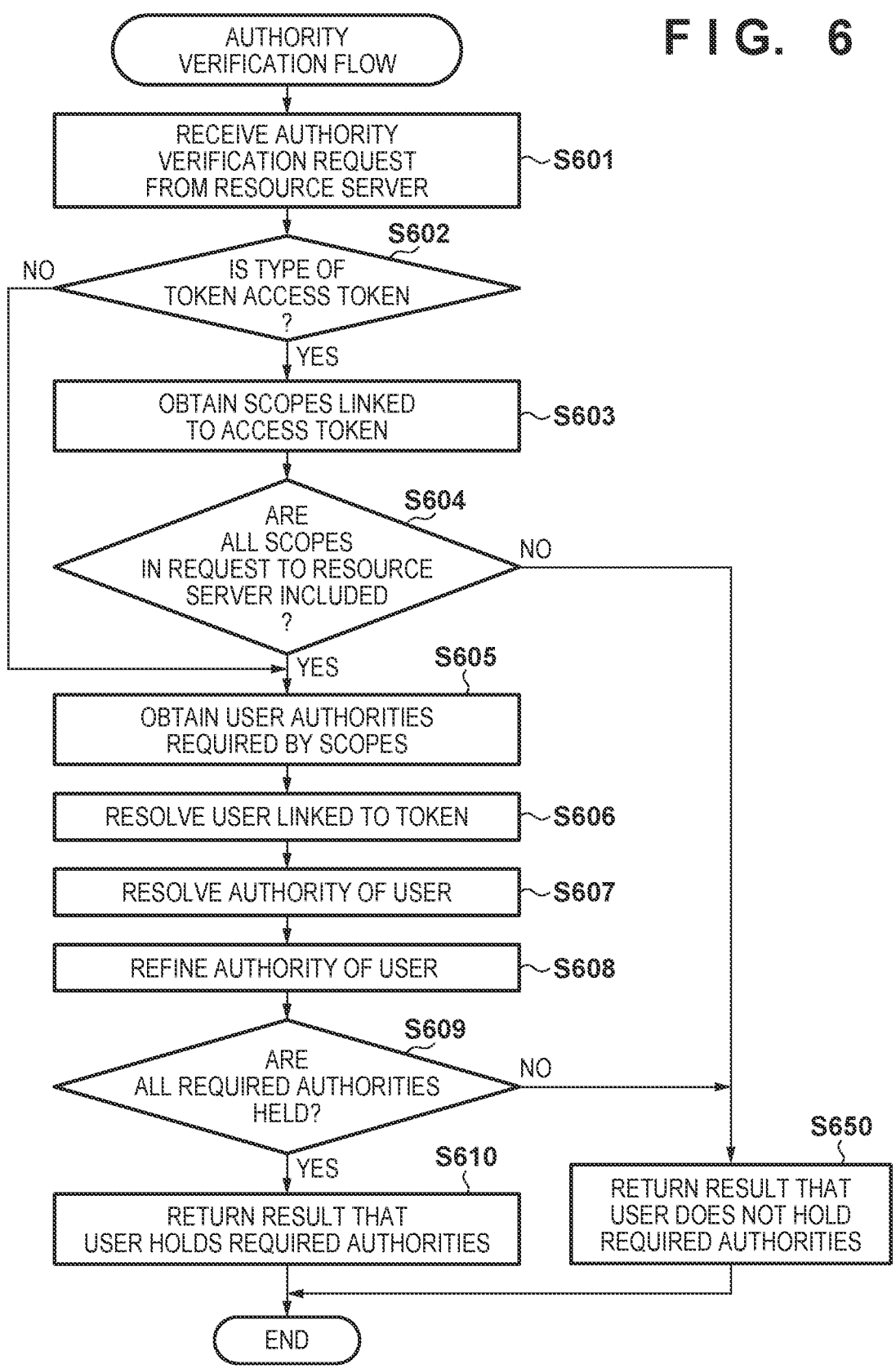
FIG. 6 is an authority verification flow according to the present embodiment.

FIG. 6 is an authority verification flow that uses an authentication token or an access token in the authentication/authorization server 151 according to the present embodiment. The present flow is started by the authority verification module 303 of the authentication/authorization server 151 receiving an authority verification request (corresponding to step S505 of FIG. 5) from the authority verification request module 353 of the resource server 152.

The authority verification module 303 in step S601 receives an authority verification request from the authority verification request module 353 of the resource server 152. Here, the authority verification request includes an authentication token or an access token that the resource access processing module 351 of the resource server 152 received from the user terminal 191 or the application server 153. In addition, the authority verification request also includes scopes required for the resource access requested of the resource access processing module 351 of the resource server 152 by the user terminal 191 or the application server 153. Furthermore, the authority verification request also includes authority information of a user with respect to a designated resource, that the resource access processing module 351 of the resource server 151 obtained from the per-resource user authority storage module 352.

The authority verification module 303 in step S602 determines whether the token received in step S601 is an authentication token or an access token. Step S605 is transitioned to when the token is an authentication token, and step S603 is transitioned to when the token is an access token.

The authority verification module 303 in step S603 queries an issued token table as is illustrated in Table 1 to obtain scopes linked with the access token received in step S601.

The authority verification module 303 in step S604 determines whether the scopes which are linked with the access token and were obtained in step S603 includes all of the scopes received in step S601. Step S605 is transitioned to when it is determined that all of the scopes are included, and step S650 is transitioned to when it is determined that even one scope is not included.

The authority verification module 303 in step S605 queries a scope table as is illustrated in Table 4 to obtain user authorities required by the scopes received in step S601. Here, assume that the scope necessary for resource use is scope.MFP-ReadWrite. In this case, it is determined that the authority of the user for whom the request was made is MFP-ReadWrite. A scope table is separately registered and maintained in the authentication/authorization server 151 for example.

TABLE 4

| Scope | Authority |
|---|---|
| scope.MFP-ReadWrite | MFP-ReadWrite |
| scope.MFP-Read | MFP-Read |
| . . . | . . . |

The authority verification module 303 in step S606 references the issued token table illustrated in Table 1 on the basis of the token received in step S601 to resolve the user linked with the token. For example, if the identifier of the token is An0011223344, it is evident that the user linked with the token is User X.

The authority verification module 303 in step S607 references the user authority table illustrated in Table 5 to resolve the authority of the user linked to the token received in step S601. For example, if the user ID is User X, their authority is MFP-ReadWrite and MFP-Read. The user authority table is separately registered and maintained in the authentication/authorization server 151 for example. The authentication/authorization server 151, which manages the user authority table and user authorities, can also be called a user authority management unit.

TABLE 5

| User ID | Authority |
| --- | --- |
| User X | MFP-ReadWrite |
| User X | MFP-Read |
| User Y | MFP-Read |
| User Z | MFP-Read |
| ... | ... |

The authority verification module 303 in step S608 uses the authority information, which is for the user with respect to the designated resource and was received in step S601, to refine the authority of the user linked to the token. The authority obtained by refining may be referred to as an access authority to distinguish it from other authorities in this embodiment and other embodiments. Configuration may be taken such that the received authority information is information indicating one authority or is information indicating a list of a plurality of authorities. Also, configuration may be taken such that it is a null value meaning an empty authority list or that the list itself is not present. Configuration may be such that a case where the received authority information is a null value is handled as if an empty set had been received, an intersection between the user authority and an empty set is taken, and a refinement result is set as "no authority". Conversely, in a case in which a null value is received, the authority of the user linked to the token may be used as is. In other cases, refinement of authority is performed by taking an intersection between the user authority and the authority information that was received along with the access token. For example, if the authorities that the User X holds are MFP-ReadWrite and MFP-Read and the authority information received in step S601 is MFP-ReadWrite, the authority of the refined result becomes MFP-ReadWrite which is the part in common therebetween. Note, refinement can be said to be processing for confirming authorities that match an authority for a resource that a specific user is accessing this time, which is designated by the resource access processing module 351 out of the authorities provided to the specific user which are managed by the authority verification module 303. It should be noted that the authorities of the specific user managed by the authority verification module 303 are not deleted.

The authority verification module 303 in step S609 determines whether the authorities resulting from the narrowing result in step S608—in other words, the authority provided to a specific user managed by the authority verification module 303 that are confirmed to match the authority with respect to the resource that is to be accessed this time—satisfy the authorities required by the scope that was obtained in step S605. Step S610 is transitioned to in a case where it is determined that all required authorities are held, and step S650 is transitioned to in a case where it is determined that even some are missing. For example, when the authority required in the scope is MFP-ReadWrite and the authority of the refined result is MFP-ReadWrite, it is determined in step S609 that the authority is satisfied. It can be determined that the authority is satisfied when the authority of the user with respect to the resource obtained by the refinement in this way includes the authority required by the scope. Here, configuration may be taken to establish an inclusion relationship between one authority and another authority in a case such as where the authority required by the scope is MFP-Read and the authority of the refining result is MFP-ReadWrite, for example. In this case, if there is an MFP-ReadWrite authority with respect to the specific resource, all that is possible with an MFP-Read authority can be performed, so it can be said that an MFP-ReadWrite authority includes an MFP-Read authority. In this way, even if authorities differ, cases in which an inclusion relationship can be established are possible.

The authority verification module 303 in step S610 returns a determination result meaning that the user holds the requested authority to the resource server 152, and this flow ends.

The authority verification module 303 in step S650 returns a determination result meaning that the user does not hold the requested authority to the resource server 152, and this flow ends.

By virtue of the present embodiment, in a case where authority verification is performed by the authentication/authorization server 151 and resource management is performed by the resource server 152, it becomes possible to control by which authority a user may perform an operation with respect to each resource. In such a case, there ceases to be a need to manage, by the authentication/authorization server 151, a user authority per resource.

Second Embodiment

Next, using the drawings, explanation is given regarding a second embodiment for working the present invention. Note that description regarding portions in common with the first embodiment is omitted, and only different portions are described below. In order for a user to be able to operate a resource in the first embodiment, it is necessary to set a per-resource user authority table as illustrated in Table 3 to the resource server 152. Furthermore, setting of a user authority table as illustrated in Table 5 to the authentication/authorization server 151 is also necessary. Although an authority setting in two tables becomes necessary in this way, it is preferable that the setting is reflected in both tables by a user making a single operation. The second embodiment of the present implementation is made in view of the previously described problem to be solved.

<Configuration of Modules of Resource Server>

Figure 8:
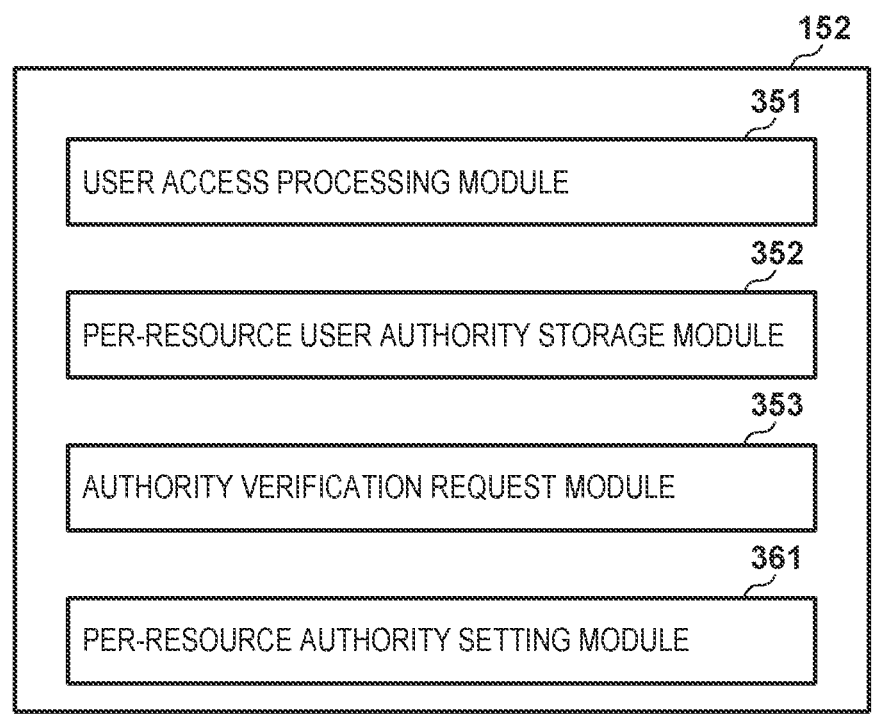
FIG. 8 is a module configuration diagram according to a second embodiment.

FIG. 8 is a view illustrating a configuration of modules of the resource server 152 according to the second embodiment. Here, the resource server 152 has a per-resource authority setting module 361 in addition to the configuration of FIG. 3B. The per-resource authority setting module 361, in accordance with a request from the user terminal 191, updates the per-resource user authority managed in Table 3, and instructs an authority setting to the authentication/authorization server 151. By this, user authority per resource can be set or released.

<Processing for Granting Authority>

FIG. 9A and FIG. 9B are an authority grant flow and an authority release flow for a user in the resource server 152 according to the second embodiment of the present implementation. FIG. 9A is a flow for granting an authority with respect to a user in the resource server 152 according to the second embodiment of the present implementation. The present flow is started by the resource server 152 receiving an authority grant request from the user terminal 191. In the present embodiment, user authority per-resource is defined in the per-resource user authority table of Table 3 according to the procedure of FIG. 9A.

The resource server 152 in step S901 receives an authority grant request per-resource. Here, information of a target user to whom to grant an authority, a target resource, and the authority to grant are included in the authority grant request.

The per-resource authority setting module 361 in step S902 confirms whether the authority corresponding to the authority grant request received in step S901 is already set. The flow ends if the authority is already set, and step S903 is transitioned to if the authority is not yet set. The authority being already set means, for example that the items corresponding to the authority information, the target resource, and the target user received together with the authority grant request are already registered in the per-resource user authority table.

The per-resource authority setting module 361 in step S903 stores the designated authority, for a designated resource, for the user designated in the authority grant request of step S901 in the per-resource user authority table as illustrated in Table 3. Here, authority of User Y with respect to Area-B is stored as MFP-ReadWrite for example.

The per-resource authority setting module 361 in step S904 increments and stores a number of grants for the designated user authority stored in step S903. The number of grants is stored in an authority grant count table as illustrated in Table 6. For example, here, that MFP-ReadWrite is granted with respect to two resources is stored for the User Y. Note that in the initial state, the contents of the authority grant count table of Table 6 are empty, and in response to a new registration, a user ID and a corresponding authority are added, and the grant count is registered as 1. After this, 1 is added to the grant count each time, in accordance with the number of authorities granted.

TABLE 6

| User ID | Authority | Grant count |
|---------|-----------|-------------|
| User X | MFP-ReadWrite | 1 |
| User X | MFP-Read | 1 |
| User Y | MFP-ReadWrite | 2 |
| ... | ... | ... |

In step S905, the per-resource authority setting module 361 instructs the authentication/authorization server 151 to grant the designated authority to the target user designated in step S901, and this flow ends. Also, the instructed authority corresponding to the authority grant instruction is stored in the authentication/authorization server 151. Specifically, the authentication/authorization server 151 additionally registers the corresponding user ID and authority information to the user authority table illustrated in Table 5 for example.

<Authority Release Processing>

FIG. 9B is a flow for releasing an authority with respect to a user in the resource server 152 according to the second embodiment of the present implementation. The present flow is started by the resource server 152 receiving an authority release request from the user terminal 191.

The resource server 152 in step S911 receives a per-resource authority release request. Here, information of a target user for whom to release an authority, a target resource, and the authority to release are included in the authority release request.

The per-resource authority setting module 361 in step S912 confirms whether the authority corresponding to the authority release request received in step S911 is already set. The flow ends if the authority is not set, and step S913 is transitioned to if the authority is set.

The per-resource authority setting module 361 in step S913 deletes information on having the designated authority, for a designated resource, for the user designated in the authority release request of step S911 from the per-resource user authority table as illustrated in Table 3.

The per-resource authority setting module 361 in step S914 decrements and stores, in the authority grant count table of Table 6, the number of grants for the user authority which is deleted in step S913.

The per-resource authority setting module 361 in step S915 confirms whether the count relating to the designated authority of the user designated in step S911 becomes zero as a result of the grant number decrementing of step S914. For example, assuming that the user and authority designated in step S911 are User X and MFP-ReadWrite, it is determined that the count becomes zero by the decrementing of step S914. Step S916 is transitioned to in a case where the count became zero, and the flow ends in a case where it does not become zero.

In step S916, the per-resource authority setting module 361 instructs the authentication/authorization server 151 to release the designated authority for the target user designated in step S911, and this flow ends. Also, the instructed authority corresponding to the authority release instruction is released in the authentication/authorization server 151. Specifically, the authentication/authorization server 151 deletes the corresponding user ID and authority information from the user authority table illustrated in Table 5 for example.

By virtue of the second embodiment as described above, in addition to the advantage in the first embodiment of being able to manage and maintain a user authority per-resource by the resource server 152, the convenience of setting authorities to two tables that are managed by different servers as with the authentication/authorization server 151 and the resource server 152 is improved. Specifically, configuration is such that, by a user performing a single operation, settings are reflected in both tables.

Third Embodiment

Next, using the drawings, explanation is given regarding a third embodiment for working the present invention. Note that description regarding portions in common with the first embodiment and second embodiment is omitted, and only different portions are described below. The third embodiment is implemented in a system which implements only the first embodiment or in a system which implements both the first embodiment and the second embodiment. In recent years, a mechanism that uses a token called a JSON Web Token (hereinafter JWT) which has other attribute information in addition to a token ID has been examined. Explanation is given below of an example of reducing processing by the authentication/authorization server 151 by using a JWT as the token and performing processing mainly on the resource server 152 side.

<Configuration of Modules of Authentication/Authorization Server and Resource Server>

Figure 10A:
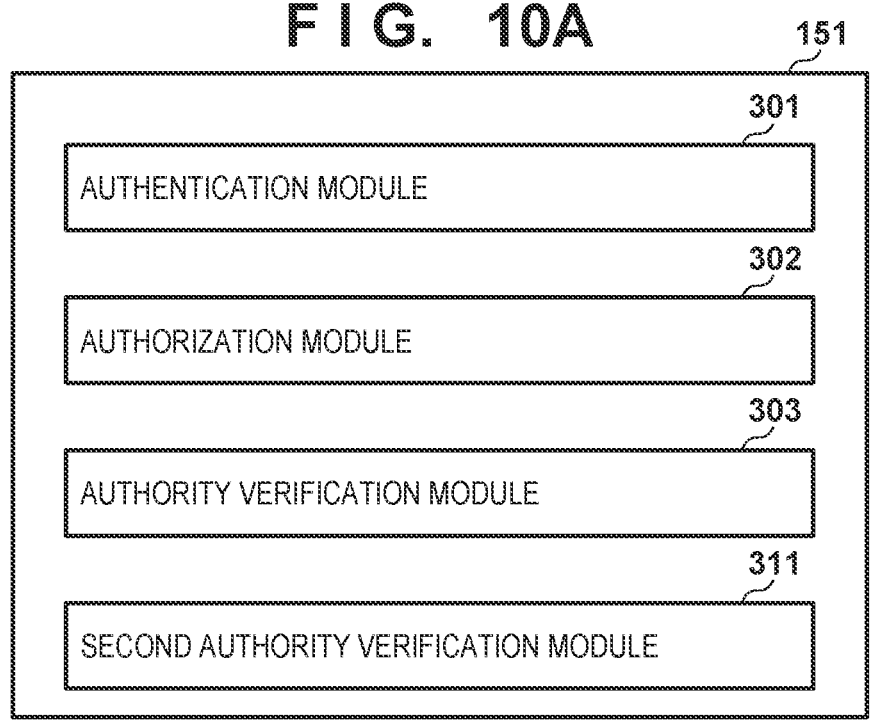
FIG. 10A and FIG. 10B are module configuration diagrams according to a third embodiment.
Figure 10B:
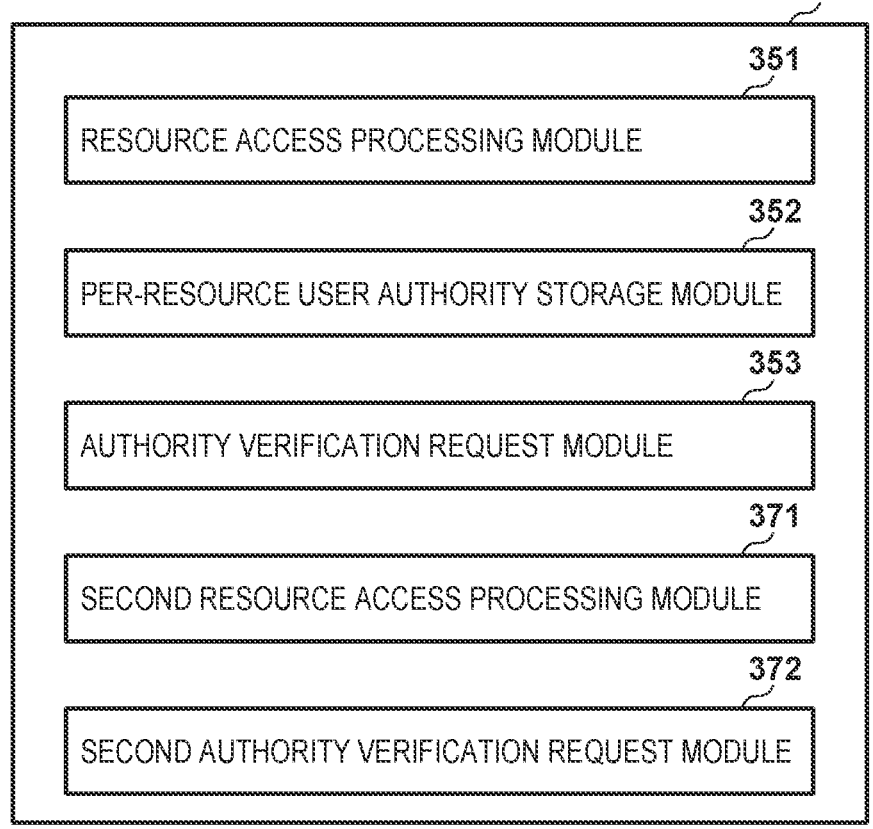

FIG. 10A and FIG. 10B are views that illustrate the configuration of modules of the authentication/authorization server 151 and the resource server 152, according to the third embodiment. Here, the authentication/authorization server 151 has a second authority verification module 311 in addition to the configuration of FIG. 3A. Also, the resource server 152 has a second resource access processing module 371 and a second authority verification request module 372 in addition to the configuration of FIG. 3B.

In the third embodiment of the present implementation, the user terminal 191 (or the application server 153) uses a JWT to make a request for resource access to the resource server 152. The second resource access processing module 371 of the resource server 152 which receives the resource access request performs a refinement of the authority based on the authorities stored in the per-resource user authority storage module 352. The second authority verification request module 372 requests authority verification to the second authority verification module 311 of the authentication/authorization server 151 based on the authority refined by the second resource access processing module 371. The second authority verification module 311 performs authority verification based on the refined authority information. Note that in the third embodiment, it is assumed that the JWT is issued by the authorization module 302 of the authentication/authorization server 151. A case in which a JWT, in particular, is used as an access token is described in the present example. Note that the authentication/authorization server 151 may issue both an access token and a JWT in accordance with a token request. In this case, a request source may clearly indicate either of an access token or a JWT token, for example. Alternatively, configuration may be such that the authentication/authorization server 151 issues only one of these. Even in the latter case, it is possible for both tokens to coexist, for example, if a server for issuing an access token and a server for issuing a JWT coexist, or if the system is in a transition period for moving from one of these to the other.

<Resource Access Processing>

Figure 11:
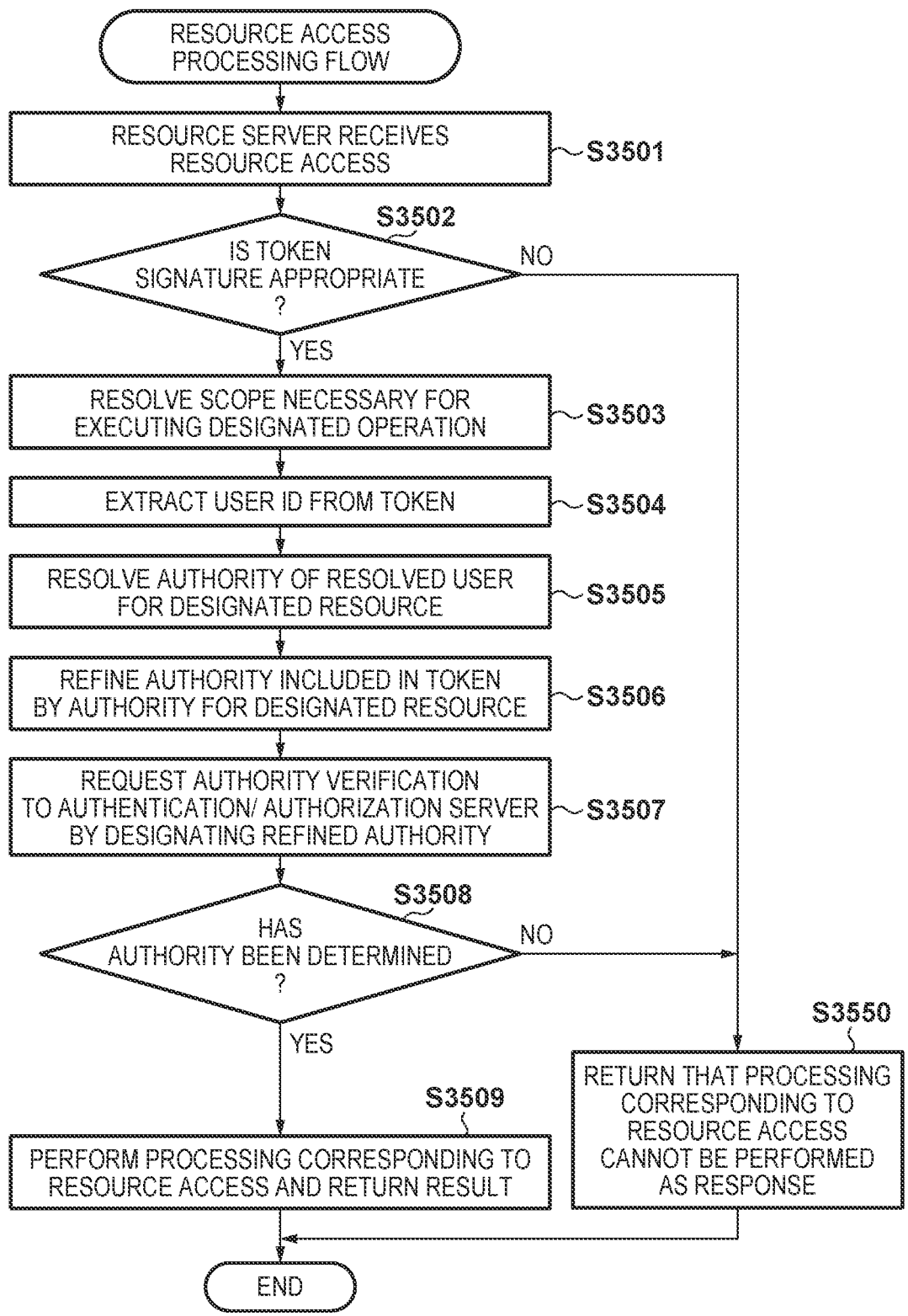
FIG. 11 is a resource access processing flow according to the third embodiment.

FIG. 11 is a processing flow for resource access in the resource server 152 according to the third embodiment. The present flow is started by the resource server 152 receiving a resource access request, which uses a JWT, from the user terminal 191 or the application server 153.

In step S3501, the second resource access processing module 371 of the resource server 152 receives a resource access request from the user terminal 191 or the application server 153. Here, the resource access request includes the JWT, an instruction for the access target resource, and details of the operation of the resource access. Here, note that the received JWT is made to include a digital signature or user ID and the authority of the user, as is illustrated in Table 7.

TABLE 7

| Token identifier | Digital signature | User ID | Authority |
|---|---|---|---|
| JWT0123456789 | MDEyMzQ1Njc4 | User X | MFP-ReadWrite, MFP-Read |

The second resource access processing module 371 in step S3502 verifies the JWT received in step S3501 by using a digital signature included in the token. Here, step S3503 is transitioned to if there is no problem with the signature, and step S3550 is transitioned to if it is determined that the signature is incorrect.

The second resource access processing module 371 in step S3503 resolves a scope necessary for executing the operation designated in step S3501 by using a per-operation request scope table as shown in Table 2.

The second resource access processing module 371 in step S3504 retrieves a user ID from the JWT received in step S3501.

The second resource access processing module 371 in step S3505 obtains authority information that sets what authority by which the user having the user ID retrieved from the JWT in step S3504 may operate with respect to the resource designated in step S3501. This per-resource user authority is obtained from the per-resource user authority table of Table 3, for example, after querying the per-resource user authority storage module 352.

The second resource access processing module 371 in step S3506 refines the authorities of the user included in the JWT received in step S3501 by the authorities obtained in step S3505. The refinement is performed by obtaining authorities common to both of these for example.

In step S3507, the second authority verification request module 372 of the resource server 152 makes a request to the authentication/authorization server 151 for an authority verification. Here, the authority verification request includes the token obtained in step S3501, the scope resolved in step S3503, and the authority information that was refined in step S3506. The procedure of the authority verification processing by the authentication/authorization server 151 is described below with reference to FIG. 12.

The second resource access processing module 371 in step S3508 confirms whether authority is determined as a result of the authority verification of step S3507. Step S3509 is transitioned to when it is determined that there is authority, and step S3550 is transitioned to when it is determined that there is no authority.

The second resource access processing module 371 in step S3509 processes the resource access request received in step S3501, returns the result to the user terminal 191, and then this flow ends.

The second resource access processing module 371 in step S3550, as a response to the user terminal 191, returns that the resource access request received in step S3501 cannot be processed, and then this flow ends.

<Authority Verification Processing for Resource Access>

Figure 12:
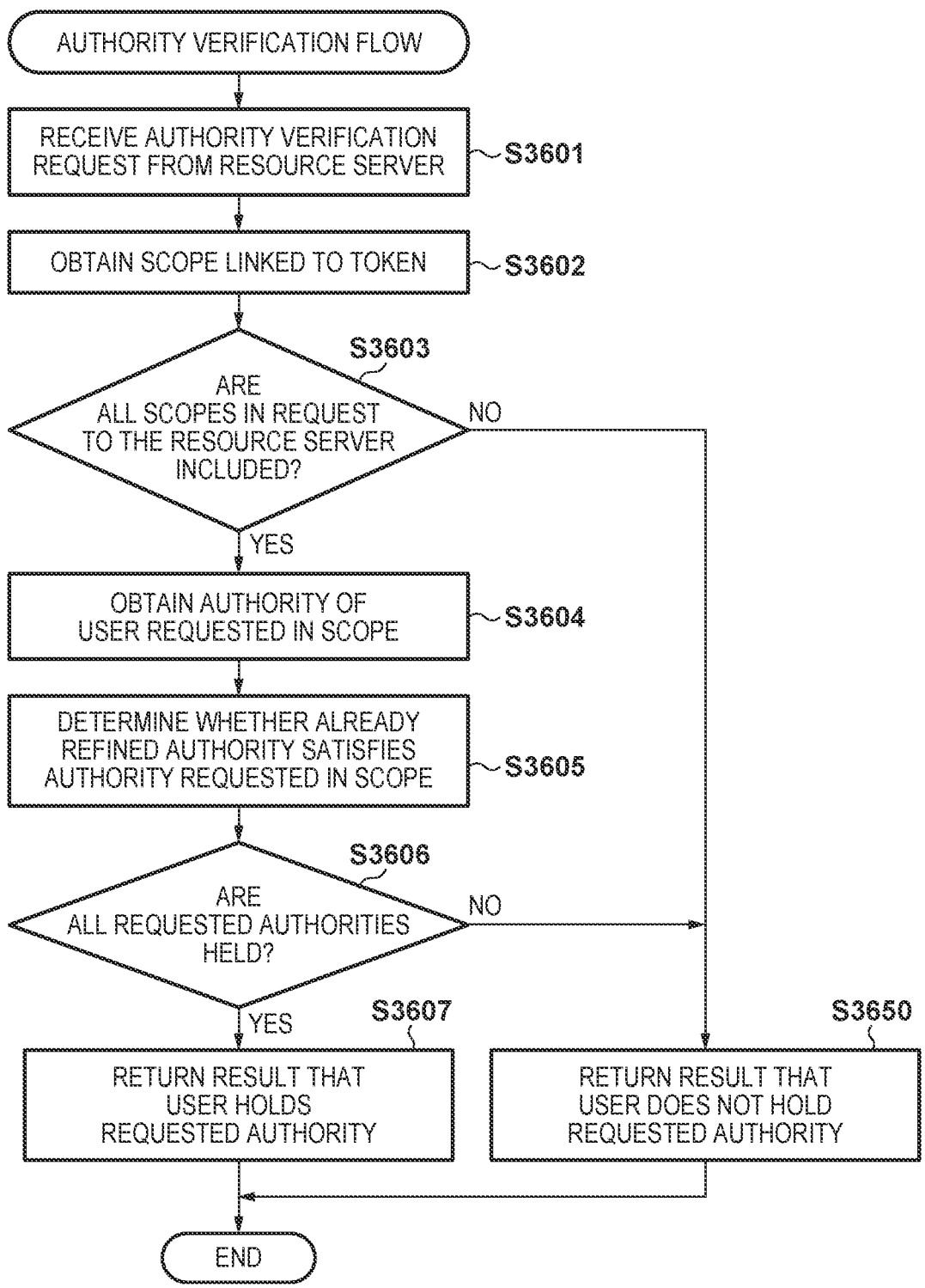
FIG. 12 is an authority verification flow according to the third embodiment.

FIG. 12 is an authority verification flow for resource access in accordance with the JWT, in the authentication/authorization server 151 according to the third embodiment. The present flow is started by the second authority verification module 311 of the authentication/authorization server 151 receiving an authority verification request from the second authority verification request module 372 of the resource server 152. Note, it is assumed that in a case where the token is an authentication token or an access token, it is processed with the flow of FIG. 6, and description regarding a case where the token is a JWT is given here.

The second authority verification module 311 in step S3601 receives an authority verification request from the second authority verification request module 372 of the resource server 152. Here, the authority verification request includes the JWT received by the second resource access processing module 371 of the resource server 152 from the user terminal 191. In addition, the authority verification request also includes scopes required for the resource access requested of the second resource access processing module 371 of the resource server 152 by the user terminal 191. Furthermore, the authority verification request also includes authority information resulting from the second resource access processing module 371 of the resource server 151 refining the authority disclosed in the JWT by the authority stored in the per-resource user authority storage module 352.

The second authority verification module 311 in step S3602 queries a second issued token table as is illustrated in Table 8 to obtain scopes linked with the JWT received in step S3601. Here, if the identifier of the JWT received in step S3601 is JWT 0123456789, the obtained scopes are scope.MFP-ReadWrite and scope.MFP-Read. Note, the second issued token table is used in the present embodiment in place of the issued token table illustrated in Table 1. Table 8 is an example of the second issued token table. In this embodiment, configuration may also be taken such that an access token or a JWT is selectively issued in accordance with a request source designation in step S457 of FIG. 4B.

TABLE 8

| Token identifier | Token type | User ID | Scope |
| --- | --- | --- | --- |
| An0011223344 | Authentication token | User X | (none) |
| An5566778899 | Authentication token | User Y | (none) |
| An7788990011 | Authentication token | User Z | (none) |
| Az99887766 | Access token | User X | scope.MFP-ReadWrite, scope.MFP-Read |
| JWT0123456789 | JWT | User X | scope.MFP-ReadWrite, scope.MFP-Read |

The second authority verification module 311 in step S3603 determines whether the scopes which are linked with the JWT and were obtained in step S3602 include all of the scopes received in step S3601. Step S3604 is transitioned to when it is determined that all of the scopes are included, and step S3650 is transitioned to when it is determined that even one scope is not included.

The second authority verification module 311 in step S3604 queries a scope table as is illustrated in Table 4 to obtain the requested user authority by the scope received in step S3601. Here, assume that the scope necessary for resource use is scope.MFP-ReadWrite. In this case, it is determined that the authority of the requested user is MFP-ReadWrite.

The second authority verification module 311 in step S3605 determines whether the already refined authority information received in step S601 includes all necessary authorities obtained in step S3604.

The second authority verification module 311 in step S3606 confirms the result of the determination of step S3605. Step S3607 is transitioned to in a case where it is determined that all requested authorities are held, and step S3650 is transitioned to in a case where it is determined that even some are missing.

The second authority verification module 311 in step S3607 returns a result meaning that the user holds the requested authority to the resource server 152, and this flow ends.

The second authority verification module 311 in step S3650 returns a result meaning that the user does not hold the requested authority to the resource server 152, and this flow ends.

By virtue of the third embodiment of the present implementation, it is possible to realize authority control per-resource while reducing processing of the authentication/authorization server 151 by using a JWT as a token and performing processing mainly on the resource server 152 side. In particular, processing for refining authority is executed in the resource server 152, and whether the already refined authority satisfies the authority requested in the scope is determined in the authentication/authorization server 151. For this reason, if the authentication/authorization server 151 supports a JWT, it is possible to realize granting of a user authority per resource by the processing by the resource server 152 without significantly changing the authority verification procedure.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-229190, filed Nov. 25, 2016 which is hereby incorporated by reference herein in its entirety.

What is claimed is:

1. An authority verification system operable to verify an access authority for a resource, the system comprising a terminal apparatus, a resource server for providing a resource and an authentication/authorization server, wherein
the terminal apparatus includes at least a processor and at least a memory coupled to the at least the processor and having stored thereon instructions which, when executed by the at least the processor, cause the at least the processor to function as:
a transmission unit configured to transmit a resource access request,
the resource server includes at least a processor and at least a memory coupled to the at least the processor and having stored thereon instructions which, when executed by the at least the processor, cause the at least the processor to function as:
a per-resource user authority management unit configured to manage per-resource user authorities established for each resource; and
a verification request unit configured to, in response to receiving the resource access request, resolve a user authority for a specified resource based on a token included in the resource access request and transmit an authority verification request including the token and the resolved user authority to the authentication/authorization server,
the authentication/authorization server includes at least a processor and at least a memory coupled to the at least the processor and having stored thereon instructions which, when executed by the at least the processor, cause the at least the processor to function as:
a user authority management unit configured to manage user authorities;
a refinement unit configured to confirm user authorities based on the token included in the authority verification request and determine an authority corresponding to the resolved user authority included in the authority verification request from among the confirmed user authorities as an access authority to be verified; and
a validation unit configured to determine whether access to the resource corresponding to the resource access request is permitted based on the access authority refined by the refinement unit,
wherein the terminal apparatus that is a transmission source of the resource access request is allowed to access the resource in a case where it is determined that the access is permitted by the validation unit,
wherein the authentication/authorization server further functions as:
a unit of the authority verification system configured to delegate a user authority to the transmission source of the resource access request and to issue an access token or a JSON web token indicating a delegation source user and a delegated authority, and
wherein the user authority that the resource access request transmission source has is the delegated user authority that is indicated by the access token or the JSON web token, and
the authority necessary for the resource access request with respect to a designated resource of the resource access request is associated with the delegation source user for the user authority.

2. The authority verification system according to claim 1, wherein the refinement unit makes the access authority be an authority that is shared by the authority necessary for the resource access request with respect to the resource and the user authority held by the transmission source of the resource access request.

3. The authority verification system according to claim 1, wherein the refinement unit does not grant the access authority in a case where the authority necessary for the resource access request with respect to the resource is empty.

4. The authority verification system according to claim 1, wherein the refinement unit makes the access authority be the user authority held by the resource access request transmission source in a case where the authority necessary for the resource access request with respect to the resource is empty.

5. The authority verification system according to claim 1, wherein the resource server functions as:
a unit configured to, in accordance with an operation with respect to the per-resource user authorities, add a designated per-resource user authority to the per-resource user authorities managed by the per-resource user authority management unit; and
a unit configured to delete a designated per-resource user authority from the per-resource user authorities managed by the per-resource user authority management unit.

6. The authority verification system according to claim 5, wherein in a case where per-resource user authorities of a specific user are all deleted from the per-resource user authority managed by the per-resource user authority management unit, a user authority of the specific user is deleted from the user authorities managed by the user authority management unit.

7. An authority verification method for verifying an access authority for a resource, which is performed by an information processing system comprising a terminal apparatus, a resource server for providing a resource and an authentication/authorization server, the method comprising:
by the terminal apparatus, transmitting a resource access request,
by the resource server, managing per-resource user authorities established for each resource; and
by the resource server, in response to receiving the resource access request, resolving a user authority for a specified resource based on a token included in the resource access request and transmitting an authority verification request including the token and the resolved user authority to the authentication/authorization server,
by the authentication/authorization server, managing user authorities;
by the authentication/authorization server, confirming user authorities based on the token included in the authority verification request and determining an authority corresponding to the resolved user authority included in the authority verification request from among the confirmed user authorities as an access authority to be verified;
by the authentication/authorization server, determining whether access to the resource corresponding to the resource access request is permitted based on the access authority refined, delegating a user authority to the transmission source of the resource access request, and issuing an access token or a JSON web token indicating a delegation source user and a delegated authority,
wherein the terminal apparatus that is a transmission source of the resource access request is allowed to access the resource in a case where it is determined that the access is permitted, and wherein the user authority that the resource access request transmission source has is the delegated user authority that is indicated by the access token or the JSON web token, and
the authority necessary for the resource access request with respect to a designated resource of the resource access request is associated with the delegation source user for the user authority.

* * * * *